(12) United States Patent
Miyahara

(10) Patent No.: US 6,449,469 B1
(45) Date of Patent: *Sep. 10, 2002

(54) SWITCHED DIRECTIONAL ANTENNA FOR AUTOMOTIVE RADIO RECEIVERS

(75) Inventor: Shunji Miyahara, Yokohama (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/260,325

(22) Filed: Mar. 1, 1999

(51) Int. Cl.[7] ............................. H04B 1/06; H04B 7/00
(52) U.S. Cl. ................ 455/273; 455/276.1; 455/277.1
(58) Field of Search ................................. 455/273, 134, 455/137, 139, 275, 276.1, 277.1, 277.2, 278.1; 342/446, 417, 375, 380; 375/347

(56) References Cited

U.S. PATENT DOCUMENTS

| | | | |
|---|---|---|---|
| 3,996,592 A | | 12/1976 | Kline et al. |
| 4,217,587 A | | 8/1980 | Jacomini |
| 4,394,779 A | * | 7/1983 | Hansen ........................ 455/277 |
| 5,107,273 A | * | 4/1992 | Roberts ........................ 342/417 |
| 6,064,865 A | * | 5/2000 | Kuo et al. .................... 455/135 |
| 6,161,001 A | * | 12/2000 | Iinuma ........................ 455/137 |
| 6,167,243 A | * | 12/2000 | Wang et al. ................. 455/137 |

OTHER PUBLICATIONS

Hirschmann Diversity Systems, Scan Diversity Phase–Control–Diversity, Mobile Communication, pp. 1–5.

* cited by examiner

Primary Examiner—Nay Maung
Assistant Examiner—Miguel D. Green
(74) Attorney, Agent, or Firm—MacMillan, Sobanski & Todd, LLC

(57) ABSTRACT

A directional antenna system includes several antenna elements, a phase shift/attenuation circuit, and a switching system. The circuit synthesizes four antenna patterns which are oriented toward the front, back, left, and right sides of a vehicle. The system switches between antenna patterns depending upon received signal strength at any particular moment.

9 Claims, 2 Drawing Sheets ated with the front, back, left, and right sides of the vehicle, respectively. A tuner generates a tuner signal in response to the combined antenna signal. A quality detector generates a detection signal in response to a comparison of a quality of the tuner signal with a predetermined quality. A pattern selector is coupled to the quality detector in the antenna combiner to change-over the antenna combiner to a different one of the predetermined phase/amplitude combinations in response to the detection signal.

SWITCHED DIRECTIONAL ANTENNA FOR AUTOMOTIVE RADIO RECEIVERS

BACKGROUND OF THE INVENTION

The present invention relates in general to a mobile radio receiver with reduced distortion and reduced signal fading, and more specifically, to a switched directional antenna utilizing predetermined antenna patterns aligned with the front, back, left, and right sides of a mobile vehicle.

A primary source of noise and distortion in radio receivers is from multipath interference. This is a localized effect resulting from interaction between separate signals from a transmitter which traverse different paths (e.g., via reflections) to reach a receiving antenna. Because of the superposition of several signals (i.e., echoes and/or direct waves), the signal strength of the received signal changes drastically and may fall below the noise floor. Based upon the differences in path lengths of each received wave, the multipath distortion or fading may include short-time delayed multipath interference and/or long-time delayed multipath interference signals. The multipath interference depends upon diverse geographic features and buildings. In an urban area with high buildings along both sides of a street, for example, the broadcast waves propagate along the street and become mixed with many short-time delayed signals. Along a river side, long-time delayed signals may be mixed with both direct and quasi-direct signals. In a basin, there may be several long-time delayed signals arriving from different directions. This variability has made it difficult to solve the problem of multipath distortion in mobile radio receivers.

A well known means for reducing multipath distortion is through use of space-diversity antennas in a radio receiver system. By switching between antenna signals from spaced apart antennas, specific multipath events can be avoided if the antenna spacing is enough to insure that both antennas will not experience the same multipath event at the same time. However, since space diversity radio receiver systems cannot select only a single wave, they cannot completely avoid multipath distortion. The distortion is especially serious in long-time delay multipath conditions, such as may exist at a riverside or in a basin.

Another technique that has been used to reduce multipath interference is known as antenna beam steering. These systems use an antenna array which is operated in a manner to receive broadcast waves from a single direction only. However, a complex controller must be employed in order to scan the antenna beam and align it with the strongest incoming broadcast signal. The known antenna arrays and controllers are undesirably complex and expensive, and are not practical for use in automotive radio receiver systems.

SUMMARY OF THE INVENTION

The present invention has the advantage of providing an inexpensive mobile radio receiver with greatly reduced multipath distortion while maintaining reasonable gain for the desired signal.

In one aspect of the invention, a radio receiver system is installed on a vehicle, wherein the vehicle has front, back, left and right sides. A plurality of antenna elements are mounted on the vehicle, each antenna element producing a respective radio-frequency signal. An antenna combiner is coupled to the antenna elements electronically combining the radio-frequency signals according to a selected one of four predetermined phase/amplitude combinations to generate a combined antenna signal. The four predetermined phase/amplitude combinations each provides a respective directivity pattern substantially aligned with the front, back, left, and right sides of the vehicle, respectively. A tuner generates a tuner signal in response to the combined antenna signal. A quality detector generates a detection signal in response to a comparison of a quality of the tuner signal with a predetermined quality. A pattern selector is coupled to the quality detector in the antenna combiner to change-over the antenna combiner to a different one of the predetermined phase/amplitude combinations in response to the detection signal.

DETAILED DESCRIPTION OF PREFERRED EMBODIMENTS

Figure 1:
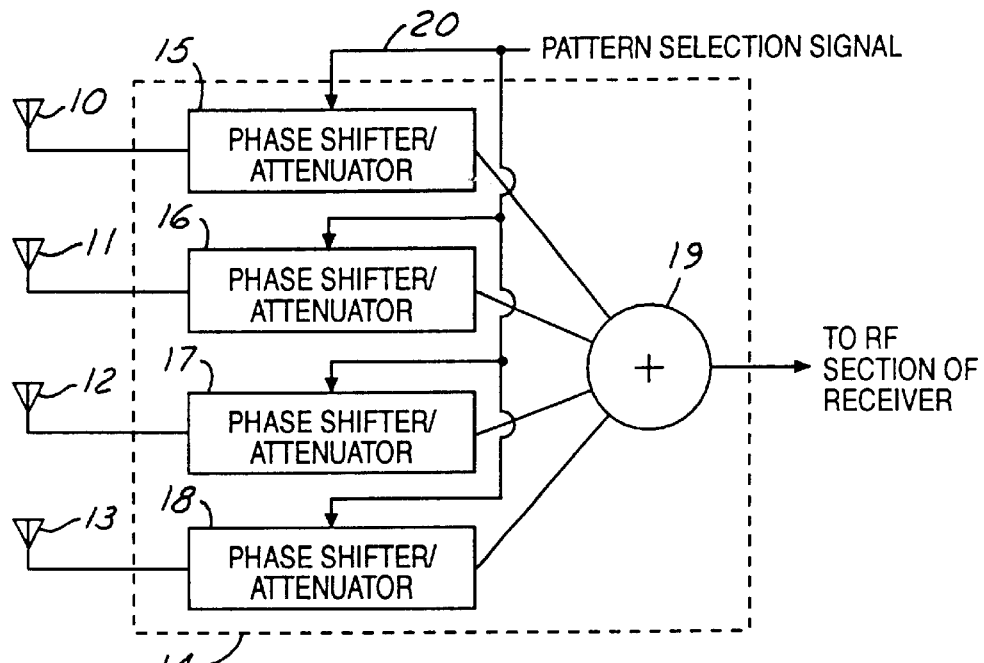
FIG. 1 is a block diagram showing antenna elements and an antenna combiner of the present invention.

FIG. 1 shows an antenna combiner for providing predetermined, fixed antenna patterns by electronically combining separate antenna signals using a limited number of phase-attenuation combinations, as opposed to the continuous beam steering of the prior art. A plurality of antenna elements 10–13 are connected to an antenna combiner 14. Antenna combiner 14 includes four different variable phase shifter/attenuators 15–18 having their outputs combined by a summer 19 to produce a combined antenna signal which is provided to the RF section of a radio receiver. Phase shifters/attenuators 15–18 receive a pattern selection signal 20 corresponding to one of four predetermined, fixed antenna patterns.

Although four separate antenna elements are shown in FIG. 1, it will be appreciated by those skilled in the art that less than four antenna elements could be connected to phase shifters/attenuators 15–18 while still providing the four predetermined, fixed antenna patterns corresponding to the combined antenna signal. The phase shifter/attenuators each may provide four different fixed phase shift and attenuation factors, thereby providing an inexpensive circuit implementation.

Figure 2:
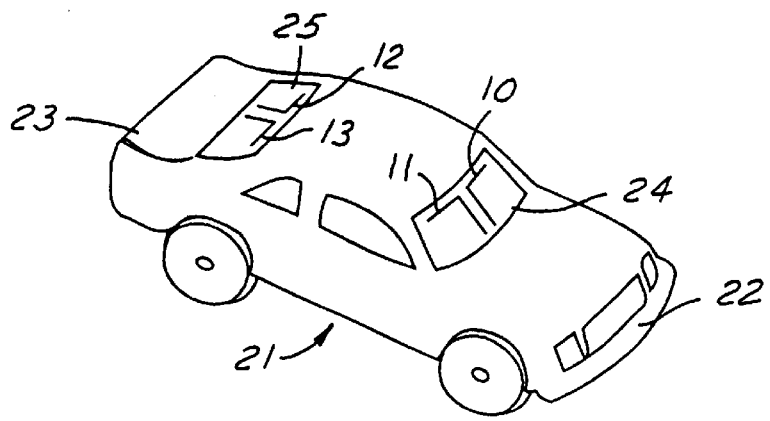
FIG. 2 is a perspective view of a vehicle including antenna elements mounted thereon.

As shown in FIG. 2, a mobile vehicle 21 has a front side 22 and a rear side 23. Antenna elements 10 and 11 are glass-mounted on a front windshield 24 of vehicle 21. Antenna elements 12 and 13 are glass-mounted on a rear window 25 of vehicle 21. Using methods well known in the art, the antenna signals from antennas 10–13 may be combined to form antenna patterns having a directivity oriented in one of the predetermined directions.

Figure 3:
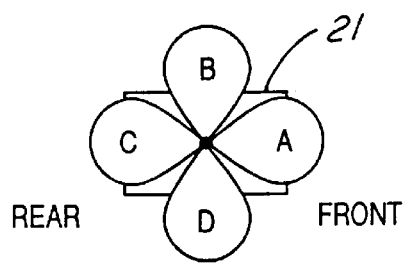
FIG. 3 is a schematic view showing antenna patterns utilized by the present invention.

According to the present invention, four antenna patterns are utilized which have their respective directivity substantially aligned with the front, back, left and right sides of vehicle 21. This arrangement is shown in greater detail in FIG. 3, wherein antenna pattern A is oriented to the front, pattern B oriented to the left side, pattern C oriented to the rear, and pattern D oriented to the right side. In a rural or suburban environment without buildings lining the street, the direction at which broadcast waves are received can be from any direction with respect to the front of the vehicle. However, in urban environments including buildings along the streets, the direction of received broadcast waves corresponds with the direction of the street (or the direction of a cross street at intersections), and, therefore, coincides with the front or rear of the vehicle between intersections and the front, rear, right, or left sides of the vehicle at intersections. By choosing from antenna patterns A–D in response to these street directions, improved reception is obtained with supression of multipath interference from unaligned signals.

Figure 4:
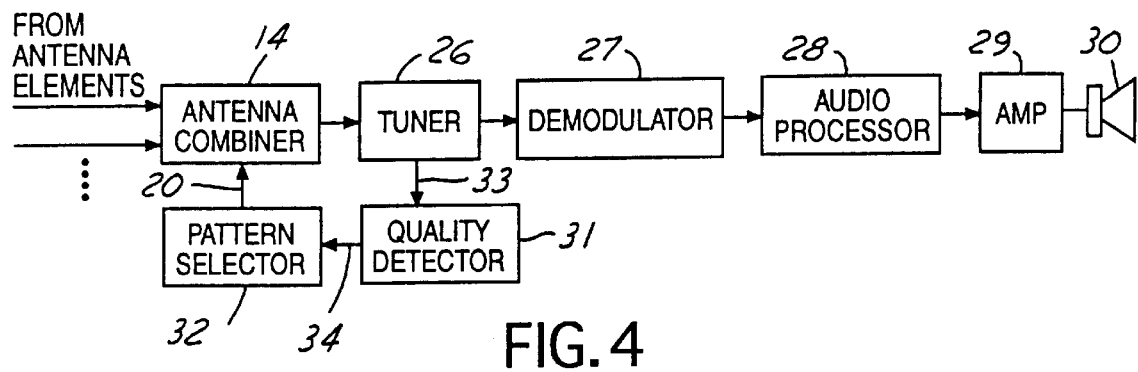
FIG. 4 shows a radio receiver system of the present invention.

The receiver system of the present invention is shown in greater detail in FIG. 4. Respective radio-frequency signals from the antenna elements are coupled to antenna combiner 14. A combined antenna signal is provided from antenna combiner 14 to a tuner 26. A tuner signal, such as an intermediate frequency (IF) signal is provided to a demodulator 27. A baseband audio signal is provided through an audio processor 28 to an amplifier 29 and finally to a speaker 30.

Tuner 26 also provides a quality signal 33 to a quality detector 31. The quality signal may be a received signal strength signal derived from the IF section of the tuner, for example. Quality detector 31 compares the instantaneous quality of the received signal to a predetermined quality, such as a predetermined signal strength threshold. If the instantaneous quality is worse than the predetermined quality, then a detection signal 34 is generated by quality detector 31 and is provided to a pattern selector 32. Pattern selector 32 provides a pattern selection or change-over signal 20 to antenna combiner 14 for selecting a different one of the predetermined phase/amplitude combinations within antenna combiner 14 so that a different one of the directivity patterns aligned with the front, back, left and right sides of the vehicle is selected.

The switching system comprising quality detector 31 and pattern selector 32 may employ any conventional antenna switching algorithm as used in space diversity receivers, for example. One such algorithm, the "switch and examine" method in which the antenna is switched whenever the current received signal strength is lower than a threshold, may be employed. The predetermined quality threshold may be either a fixed value or may be obtained as a percentage of a moving average of the actual signal strength. Another example of a typical algorithm is known as the "switch and stay" method, wherein a change-over to another antenna pattern is made only when the quality of the currently received signal transitions from being better than to worse than the predetermined quality.

Pattern selector 32 preferably generates a control signal which follows a predetermined sequence in order to reconfigure antenna combiner 14 according to the predetermined antenna patterns. Preferably, the predetermined sequence includes four predetermined fixed voltages, each voltage causing antenna combiner 14 to select a respective antenna pattern A, B, C, or D.

Figure 5:
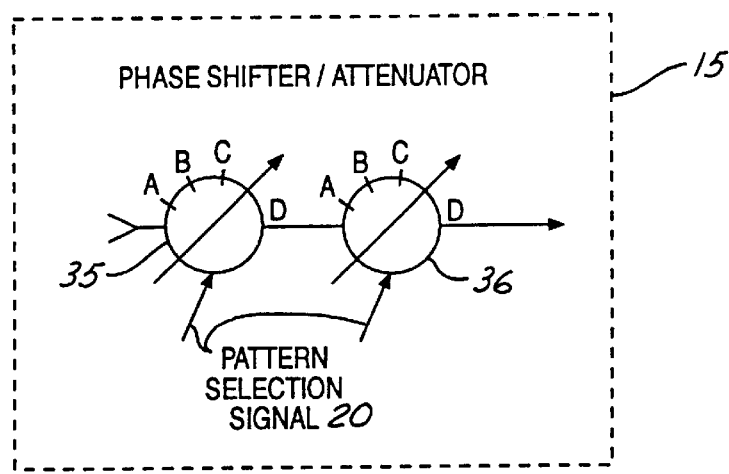
FIG. 5 shows a phase shifter/attenuator in greater detail.

FIG. 5 shows a phase shifter/attenuator 15 in greater detail wherein pattern selection signal 20 is coupled to a four-state phase shifter 35 and a four-state attenuator 36. These may be voltage controlled, for example. Depending on the voltage of signal 20, phase shifter 35 provides a predetermined phase shift corresponding to antenna directivity patterns A, B, C, or D. Likewise, attenuator 36 is responsive to signal 20 in order to provide an attenuation corresponding to patterns A, B, C, or D. Phase shifter 35 may be comprised of transmission lines, reactive circuits, or PIN-diode phase shifters, while attenuator 36 may be comprised of high-attenuation transmission lines, switched resistive circuits, or PIN-diode attenuators, as known in the art. It may be possible in some instances to obtain the desired antenna patterns without using only phase shifter (i.e., without any attenuators).

Figure 6:
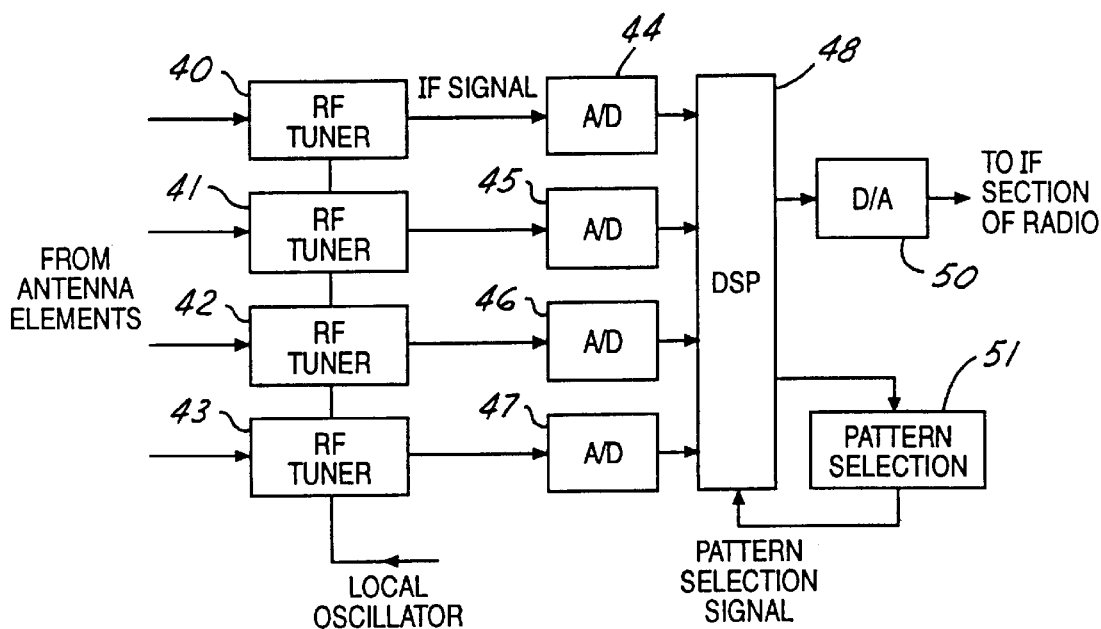
FIG. 6 is a block diagram showing an alternative embodiment of the present invention using a digital signal processor.

FIG. 6 shows an alternative embodiment of the present invention using digital signal processing. RF signals from a plurality of antenna elements are coupled to RF tuners 40–43. A local oscillator signal tunes each of the tuners to the same broadcast signal and the resulting IF signals are coupled to analog-to-digital converters 44–47, respectively. The digitized IF signals are input to a digital signal processor (DSP) 48. DSP 48 combines the digitized IF signals according to predetermined fixed phase shifts and attenuations of each individual IF signal in order to implement the four antenna patterns aligned with the front, back, left, and right sides of the vehicle. The combined antenna signal may be coupled to a digital-to-analog converter 50, and then provided to the IF section of an analog radio receiver. Of course, the combined antenna signal could be maintained as a digital signal with further receiver processing being performed digitally by DSP 48. The quality of the combined IF signal is monitored by a pattern selection block 51 and a pattern selection signal is used within DSP 48 to select a different antenna pattern as necessary. Pattern selection block 51 may preferably be implemented within DSP 48.

DSP 48 includes a memory for storing 4×N attenuation values and 4×N phase shift values for obtaining four effective antenna patterns using four IF inputs, where N is the number of antenna elements (e.g., 4). DSP 48 uses bit shifting to provide attenuation, digital delay to provide phase shifting, and includes an adder for combining the phase shifted/attenuated IF signals.

DSP 48 and pattern selection block 51 may be implemented using a general purpose, programmable digital signal processor or may be comprised of a custom-designed application specific integrated circuit (ASIC).

The foregoing invention provides a directional antenna radio receiver system wherein an antenna gain can be maintained which is greater than or equal to that for a conventional diversity antenna system. Furthermore, multi-path fading is greatly reduced without the complexity and expense of beam steering systems. Applicant has discovered that the predetermined fixed antenna patterns utilized substantially aligned with the front, back, left, and right sides of the vehicle can provide even better performance for avoiding multipath fading than continuous tracking beam steering systems. The reason for this improvement lies in the fact that when driving in urban environments, at least one of the received broadcast waves comes from a non-random direction (i.e., aligned with the front, back, left, or right sides of the vehicle).

What is claimed is:

1. A radio receiver system installed on a vehicle, said vehicle having front, back, left, and right sides, said radio receiver system comprising:
   a plurality of antenna elements mounted on said vehicle, each antenna element producing a respective radio-frequency signal;
   an antenna combiner coupled to said antenna elements electronically combining said radio-frequency signals according to a selected one of four predetermined phase/amplitude combinations to generate a combined antenna signal, wherein said four predetermined phase/ amplitude combinations each provides a respective directivity pattern substantially aligned with said front, back, left, and right sides, respectively, whereby said front and back directivity patterns are aligned with a street upon which said vehicle travels;

a tuner generating a tuner signal in response to said combined antenna signal;

a quality detector generating a detection signal in response to a comparison of a quality of said tuner signal and a predetermined quality; and a pattern selector coupled to said quality detector and said antenna combiner to change-over said antenna combiner to a different one of said predetermined phase/amplitude combinations in response to said detection signal.

2. The radio receiver system of claim 1 wherein said antenna combiner is comprised of four voltage-controlled phase shifters connected in respective pairs to a respective one of four voltage-controlled attenuators, each of said pairs being connected to a summer which produces said combined antenna signal.

3. The radio receiver system of claim 2 wherein said plurality of antenna elements are comprised of four glass-mounted elements, each element being connected to a respective one of said phase shifter/attenuator pairs.

4. The radio receiver system of claim 1 wherein said antenna combiner is comprised of a digital signal processor including predetermined phase shift and attenuation values stored in memory.

5. The radio receiver system of claim 4 wherein said quality detector and said pattern selector are contained within said digital signal processor.

6. The radio receiver system of claim 1 wherein said tuner signal is an intermediate frequency (IF) signal, and wherein said predetermined quality is a predetermined signal strength of said IF signal.

7. The radio receiver system of claim 1 wherein said tuner signal is an intermediate frequency (IF) signal, and wherein said predetermined quality is a predetermined percent of average signal strength of said IF signal.

8. The radio receiver system of claim 1 wherein said phase/amplitude combinations only shift the phases of respective signal.

9. The radio receiver system of claim 1 wherein transmission lines provide said phase/amplitude combinations.

* * * * *